July 13, 1943.    J. M. LEGGITT    2,324,092
STALK CUTTER
Filed Aug. 11, 1941
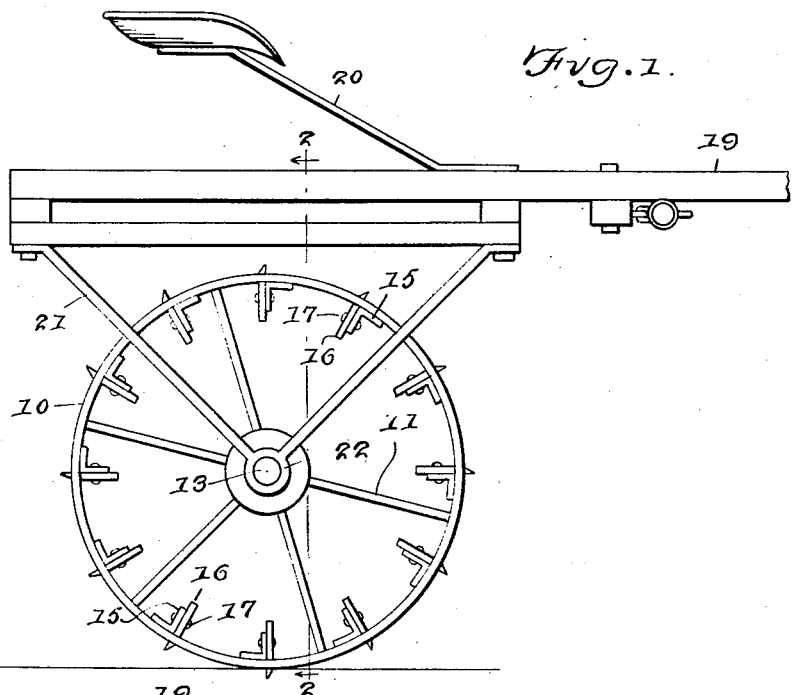
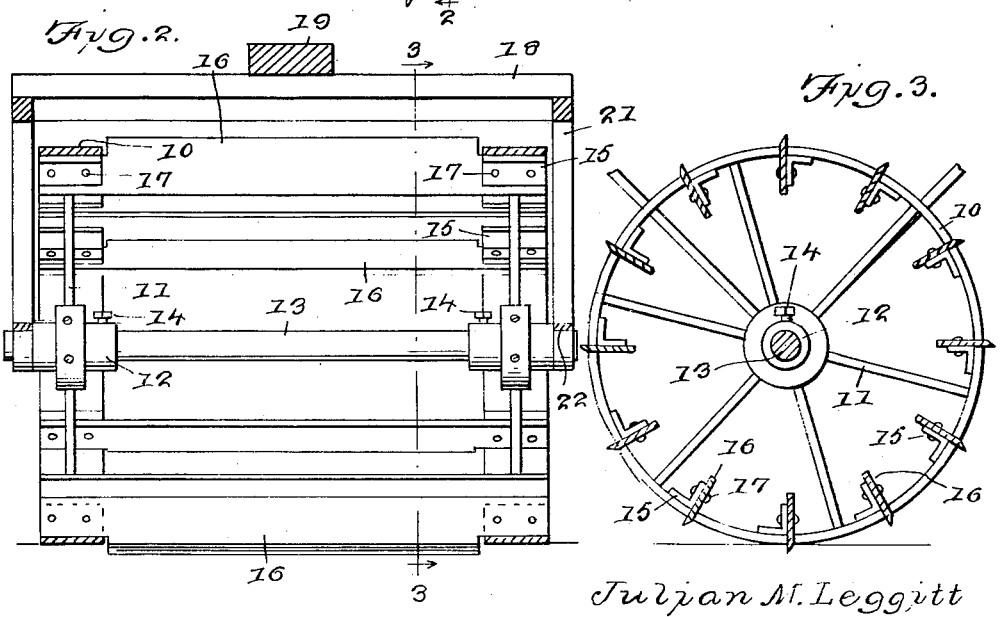
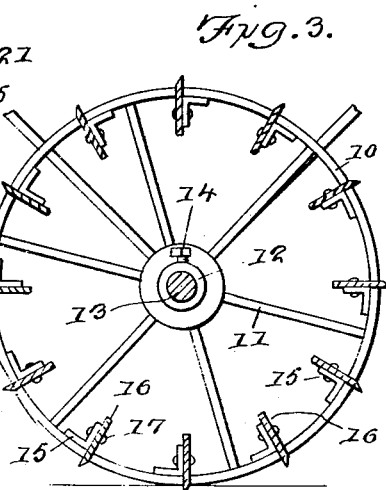
Julian M. Leggitt
INVENTOR.
BY
Victor J. Evans & Co.
ATTORNEYS Patented July 13, 1943

2,324,092

UNITED STATES PATENT OFFICE 2,324,092

STALK CUTTER

Julian M. Leggitt, Unadilla, Ga.

Application August 11, 1941, Serial No. 406,384

1 Claim. (Cl. 55—61)

This invention relates to a stalk cutter and has for an object to provide a device for cutting down rows of stalks and then cutting the stalks into small pieces.

A further object is to provide a device of this character in which the cutter bars are easily accessible for inspection and replacement when broken.

A further object is to provide apparatus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming a part of this specification:

Figure 1 is a side elevation of a stalk cutter constructed in accordance with the invention.

Figure 2 is a cross sectional view of the stalk cutter taken approximately on the line 2—2 of Figure 1.

Figure 3 is a longitudinal sectional view of the stalk cutter taken on the line 3—3 of Figure 2.

Referring now to the drawing in which like characters of reference designate similar parts in the various views, the stalk cutter comprises spaced wheels each having a wide rim 10, spokes 11, and a hub 12. The wheels are mounted near the ends of an axle 13 which is caused to rotate as a unit with the wheels through the medium of set screws 14 engaged through the hubs of the wheels and bearing upon the axle. The ends of the axle extend beyond the hubs of the wheels.

Angle irons 15 are arranged within the wheels and are rigidly secured to the rims of the wheels. The angle irons are equally spaced apart on the rims of the wheels and are equal in length to the width of the wheel rims. Those flanges of the angle irons secured to the wheel rims are similar in formation to the inner sides of the rims. The other flanges of the angle irons extend radially inward from the wheel rims and are aligned transversely of the wheel rims to secure cutter bars 16 to the wheel rims.

The cutter bars 15 are formed of steel bars sharpened at the outer edges and extend from one wheel to the other wheel. The cutter bars have their inner end portions arranged within the wheels and bolted to the radial flanges of the angle irons as shown at 17. The sharpened outer portions of the cutter bars project beyond the outer faces of the rims of the wheels.

A frame 18 is provided with a draft tongue 19 and a seat 20. The frame is equipped at the ends with inverted V-shaped hanger brackets 21 each having a hub 22 at its apex to receive the respective projecting end of the axle 13.

In operation the stalk cutter is drawn along one or more rows of stalks and the cutter bars provide both traction to rotate the rotor formed by the two wheels and cutter bars, while at the same time cutting down the stalks and then cutting the prone stalks into pieces of a length corresponding to the distance between adjacent cutter bars.

From the above description it is thought that the construction and operation of the invention will be fully understood without further explanation.

What is claimed is:

A stalk cutter comprising a pair of spaced wheels, angle irons disposed within the wheels, the angle irons being equally spaced and equal in length to the width of the wheel rims, those flanges of the angle irons secured to the wheel rims being similar in formation to the inner surfaces of the wheel rims, the other flanges of the angle irons extending radially inward from the wheel rims, cutter bars extending from one wheel to the other and having their inner portions disposed within the wheels and secured to the radial flanges of the angle irons, an axle secured to the wheels, the axle being longer than the cutter bars and extending beyond the wheels, and a tongued frame mounted upon the extended ends of the axle.

JULIAN M. LEGGITT.